US006360017B1

(12) United States Patent
Chiu et al.

(10) Patent No.: US 6,360,017 B1
(45) Date of Patent: Mar. 19, 2002

(54) PERCEPTUAL-BASED SPATIO-TEMPORAL SEGMENTATION FOR MOTION ESTIMATION

(75) Inventors: Yi-Jen Chiu, Holmdel; John Hartung, Warren, both of NJ (US); Arnaud Eric Jacquin, New York, NY (US); Robert James Safranek, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/239,135

(22) Filed: Jan. 28, 1999

Related U.S. Application Data
(60) Provisional application No. 60/076,948, filed on Mar. 5, 1998.

(51) Int. Cl.$^7$ .............................. G06K 9/36; H04N 7/12
(52) U.S. Cl. ................... 382/239; 382/236; 375/240.02
(58) Field of Search ................................. 382/236, 239, 382/232, 251; 375/240.15, 240.07, 240.08, 240.24, 240.02, 240.03, 240.13; 348/701, 390, 395.1

(56) References Cited

U.S. PATENT DOCUMENTS 5,740,278 A    4/1998  Berger et al. ............... 382/232
5,886,741 A  * 3/1999  Srivastava ............... 348/395.1

OTHER PUBLICATIONS

"Signal compression based on models of human perception," Jayant, Nikil et al., Proceedings of the IEEE, vol. 81, No. 10, 1993, pp. 1385–1422.*

T. Ebrahimi et al., "New Trends in Very Low Bitrate Video Coding," Proceedings of the IEEE, vol. 83, No. 6, pp. 877–891, Jun. 1995.

D. LeGall, "MPEG: A Video Compression Standard for Multimedia Applications," Communications of the ACM, vol. 34, No. 4, pp. 47–58, Apr. 1991.

N. S. Jayant, "Signal Compression: Technology Targets and Research Directions," IEEE Journal on Selected Areas in Communications, vol. 10, No. 5, pp. 796–818, Jun. 1992.

Y.J. Chiu et al., "Perceptual Rate–Distortion Theory," Proceedings of the 1996 IEEE International Symposium on Information Theory and Its Applications, Victoria, Canada, pp. 425–427, Sep. 17–20, 1996.

* cited by examiner

Primary Examiner—Wenpeng Chen
(74) Attorney, Agent, or Firm—Ryan, Mason & Lewis, LLP

(57) ABSTRACT

A method of encoding a video sequence including a sequence of video images includes first comparing elements of a portion of a first video image (e.g., pixels of a macroblock of a current frame) with elements of a portion of a second video image (e.g., corresponding pixels of a macroblock of a previous frame) to generate respective intensity difference values for the element comparisons. Then, a first value (e.g., one) is assigned to the intensity difference values that are above a visually perceptible threshold value and a second value (e.g., zero) is assigned to the intensity difference values that are at or below the visually perceptible threshold value. Next, the method includes summing the first and second values to generate a sum. If the sum is greater than a predetermined decision value, the portion of the first video image is encoded (e.g., motion compensated). The method is fully compatible and, thus, may be implemented with video standards such as, for example, H.261, H.263, Motion-JPEG, MPEG-1, and MPEG-2.

18 Claims, 5 Drawing Sheets

| VIDEO | CLAIRE | FOREMAN | GRANDMOM | MOM-DAUGHTER |
|---|---|---|---|---|
| MAE (Kbps) | 11.09 | 40.41 | 8.55 | 13.28 |
| PMAE (Kbps) | 7.27 | 39.24 | 5.92 | 11.48 |
| MAE (DB) | 35.76 | 32.53 | 33.70 | 33.48 |
| PMAE (DB) | 35.27 | 32.32 | 33.56 | 33.34 |
| SAVING (%) | 75.8 | 14.2 | 68.3 | 44.5 |

| VIDEO | CLAIRE | FOREMAN | GRANDMOM | MOM-DAUGHTER |
|---|---|---|---|---|
| MAE (Kbps) | 11.05 | 50.89 | 8.29 | 14.42 |
| PMAE (Kbps) | 7.80 | 50.37 | 6.38 | 13.06 |
| MAE (DB) | 35.66 | 31.99 | 33.67 | 33.30 |
| PMAE (DB) | 35.21 | 31.80 | 33.52 | 33.19 |
| SAVING (%) | 75.3 | 13.5 | 68.1 | 43.9 |

FIG. 7B

| VIDEO | CLAIRE | FOREMAN | GRANDMOM | MOM-DAUGHTER |
|---|---|---|---|---|
| MAE (Kbps) | 11.17 | 55.23 | 8.14 | 14.37 |
| PMAE (Kbps) | 7.84 | 54.39 | 6.40 | 13.21 |
| MAE (DB) | 35.64 | 31.89 | 33.67 | 33.32 |
| PMAE (DB) | 35.17 | 31.68 | 33.53 | 33.18 |
| SAVING (%) | 75.3 | 13.1 | 67.9 | 43.7 |

PERCEPTUAL-BASED SPATIO-TEMPORAL SEGMENTATION FOR MOTION ESTIMATION

CROSS REFERENCE TO RELATED APPLICATIONS

The present application claims priority of U.S. provisional patent application identified as Ser. No. 60/076,948, filed on Mar. 5, 1998, entitled "Perceptual-Based Spatio-Temporal Segmentation For Motion Estimation." The present application is also related to the U.S. patent application identified as Ser. No. 09/239,117, entitled "Perceptual Preprocessing Techniques To Reduce Complexity of Video Coders," and filed concurrently herewith on Jan. 28, 1999.

FIELD OF THE INVENTION

The invention relates generally to video encoding which utilizes motion-compensated video compression techniques, and more particularly to perceptual-based spatio-temporal segmentation for motion estimation of video signals.

BACKGROUND OF THE INVENTION

The age of digital video communications is arriving slower than many had anticipated. Picturephone (1970s) and videophone (1990s) were not commercial successes because they did not provide full color, full motion video and were not cost effective. Desktop video, using windows in computer monitors or TV screens, requires special purpose chips or graphics accelerators to perform the encoding operations. The chips usually come mounted on video boards that are expensive and whose installation intimidates most users. One main reason that these video processors are necessary is attributable to the use of block-based motion compensation, although two-dimensional block-based transforms and lossless compression of quantized transform coefficients add to the computational burden. Motion compensation accounts for over 60% of the computational effort in most video compression algorithms. Although there are algorithms that avoid motion compensation, such as Motion-JPEG, they tend to consume some ten times more transmission bandwidth or storage space because they fail to capitalize on the interframe correlation between successive frames of video. This is especially critical in video conferencing and distance learning applications, thus, rendering these algorithms uncompetitive in such applications.

Sources such as speech and video are highly correlated from sample to sample. This correlation can be used to predict each sample based on a previously reconstructed sample, and then encode the difference between the predicted value and the current sample. A main objective of motion compensation is to reduce redundancy between the adjacent pictures. There are two kinds of redundancy well known in video compression: (i) spatial (intra-frame) redundancy; and (ii) temporal (inter-frame) redundancy. Temporal correlation usually can be reduced significantly via forward, backward, or interpolative prediction based on motion compensation. The remaining spatial correlation in the temporal prediction error images can be reduced via transform coding. In addition to spatial and temporal redundancies, perceptual redundancy has begun to be considered in video processing technology, e.g., N. S. Jayant et al., "Signal Compression Based on Models of Human Perception," Proceedings of IEEE, Volume 10, Oct. 1993.

Figure 1:
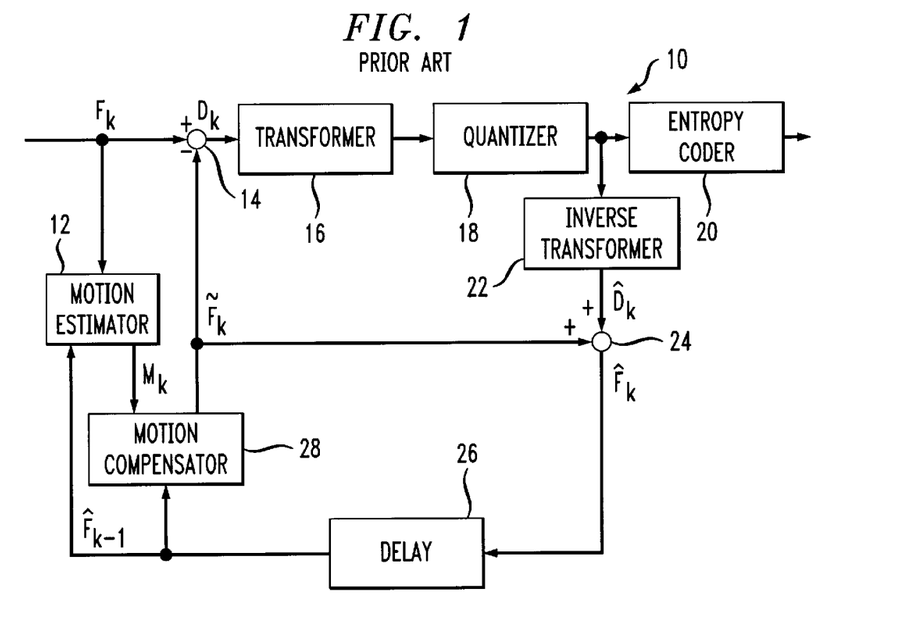
FIG. 1 is a block diagram of a conventional video encoder.

FIG. 1 illustrates a block diagram of a widely used video encoder 10 for encoding video signals for transmission, storage, and/or further processing. The encoder 10 includes a motion estimator 12 and a signal subtractor 14, both coupled to the input of the encoder. The encoder 10 also includes a transformer (e.g., a discrete cosine transform or DCT generator) 16 coupled to the signal subtractor 14, a quantizer 18 coupled to the transformer 16, and an entropy encoder 20 coupled to the quantizer 18 and the output of the encoder 10. An inverse transformer (e.g., an inverse DCT generator) 22 is also included and coupled between the quantizer 18 and the entropy encoder 20. The encoder 10 also includes a signal combiner 24 coupled to the inverse transformer 22, a delay 26 coupled to the signal combiner 24, and a motion compensator 28 coupled to the delay 26, the signal subtractor 14, the signal combiner 24, and the motion estimator 12.

It is known that motion estimation and motion compensation, as described in detail in Y. Nakaya et al., "Motion Compensation Based on Spatial Transformations," IEEE Transactions on Circuits and Systems for Video Technology," Volume 4, Number 3, Pages 339–356, June 1994, can be used to improve the inter-frame prediction by exploiting the temporal redundancy in a sequence of frames. The motion estimator 12 performs n×n (n typically equals 16) block-based matching of the $k^{th}$ input frame $F_k$ using the $k-1^{st}$ decompressed frame $\hat{F}_{k-1}$ (generated by delay 26) as the reference. The matching criterion usually employed is mean absolute error (MAE), although mean square error (MSE) may alternatively be employed. For the $i^{th}$ macroblock, the error measure $en_i(d)$ for the displacement vector d between $F_k$ and $\hat{F}_{k-1}$ is:

$$en_i(d) = \sum_{(x,y) \in B} \|F_k(x, y) - \hat{F}_{k-1}(x - d, y - d)\| \tag{1}$$

where B is the measurement block being predicted. It is evident that a motion vector obtained based on MSE is $\|x\|=x^2$ and a motion vector obtained based on MAE is $\|x\|=|x|$ in equation (1). MAE is usually used, rather than MSE, because MAE is free of multiplications and provides similar results in terms of predictive error. The offset between each block in $F_k$ and the block in $\hat{F}_{k-1}$ that best matches it is called the motion vector for that block. That is, the motion vector $mv_i$ for macroblock i is:

$$mv_i = \underset{d \in S}{\operatorname{argmin}}\, en_i(d) \tag{2}$$

where S is the search area. Interpolation schemes allow the motion vectors to achieve fractional-pel accuracy, as described in ITU-T Recommendation H.263, "Video Coding For Low Bit Rate Communication," December 1995. Motion estimation is computationally demanding in that both signals, $F_k$ and $\hat{F}_{k-1}$ entering the motion estimator 12 are high rate and, thus, the operations that have to be performed on them are computationally intensive even if the search for the best-matching block is performed only hierarchically rather than exhaustively. The result of the motion estimation is the set of motion vectors $M_k$ for $k^{th}$ frame.

The $M_k$ are usually losslessly compressed and then conveyed to the transmission channel for immediate or eventual access by the decoder. Also, the $M_k$ are fed back to the motion compensator 28 in the prediction loop of the encoder. The $M_k$ constitute a recipe for building a complete frame, herein referred to as $\tilde{F}_k$, by translating the blocks of $\hat{F}_{k-1}$. The motion compensated frame $\tilde{F}_k$ is subtracted pixel-wise from the current input frame $F_k$, in signal subtractor 14, to produce a difference frame $D_k$, often referred to as the displaced frame difference (DFD), as further described in T. Ebrahimi et al., "New Trends in Very Low Bit Rate Video Coding," Proceedings of the IEEE, Volume 83, Number 6, Pages 877–891, June 1995; and W. P. Li et al., "Vector-based Signal Processing and Quantization For Image and Video Compression," Proceedings of the IEEE, Volume 83, Number 2, Pages 317–335, February 1995. The remaining spatial correlation in $D_k$ is eliminated by the transformer 16 and the quantizer 18. The transformer may, for example, be a discrete cosine transform (DCT) generator which generates DCT coefficients for macroblocks of frames. The quantizer then quantizes these coefficients. The lossy version of $D_k$, denoted as $\hat{D}_k$ and generated by inverse transformer 22, and the motion compensated frame $\tilde{F}_k$ are used in the compressor/feedback loop to reconstruct the reference frame $\hat{F}_k$ for the next input frame $\hat{F}_{k-1}$. Finally, the Huffman (or arithmetic) coded lossy compressed version of $D_k$, generated by the entropy encoder 20, is transmitted to the decoder. It is to be appreciated that FIG. 1 represents a generic coder architecture described in the current video codec (coder/decoder) standards of H.261, H.263, MPEG-1, and MPEG-2. Further details on these standards are respectively described in: M. Liou, "Overview of the P*64 Kbit/s Video Coding Standard," Communications of the ACM, Volume 34, Number 4, Pages 59–63, April 1991; ITU-T Recommendation H.263, "Video Coding For Low Bit Rate Communication," December 1995; D. LeGall, "MPEG: A Video Compression Standard for Multimedia Applications," Communications of the ACM, Volume 34, Number 4, April 1991; and B. Haskell et al., "Digital Video: An Introduction to MPEG-2," Chapman and Hall, 1997.

Picture quality, coding bit rate, computational complexity, and latency are the four aspects of video codecs that can be traded-off when designing a video codec system. This is further discussed in N. S. Jayant, "Signal Compression: Technology Targets and Research Direction," IEEE Journal on Selected Areas in Communications, Volume 10, Number 5, Pages 796–818, June 1992. A main objective of a video codec is to represent the original signal with minimal bit rate while maintaining acceptable picture quality, delay, and computational complexity. From the above-mentioned rationale of motion estimation, the motion vectors are attained as the displacement having the minimal error metric. Although this achieves minimum-MAE in the residual block, it does not necessarily result in the best perceptual quality since MAE is not always a good indicator of video quality. In low bit rate video coding, the overhead in sending the motion vectors becomes a significant proportion of the total data rate. The minimum-MAE motion vector may not achieve the minimum joint entropy for coding the residual block and motion vector, and thus may not achieve the best compression efficiency. Another problem occurs in the smooth, still motion backgrounds where zero-displaced motion vectors may not be selected based strictly on minimum-MAE criteria. In this case, the zero-displaced motion vector is a better candidate than the minimum-MAE motion vector because the codeword for the zero-displaced motion vector is usually smaller and, thus, the zero-displaced motion vector will generate lower combined data rates for DCT coefficients and motion vectors without any loss of picture quality. If it can be determined that zero-displaced motion vector is the suitable one to select in the beginning phase, a large computational effort can be saved by avoiding motion estimation for these macroblocks.

However, it is to be appreciated that since motion estimation/compensation imposes such a significant computational load on the resources of an encoder and a corresponding decoder, it would be highly desirable to develop encoding techniques that segment frames into portions that should be motion compressed and those that do not need to be motion compressed.

SUMMARY OF THE INVENTION

The invention provides video encoding apparatus and methodologies which, inter alia, improve the computational efficiency and compression ratio associated with encoding a video signal. This is accomplished by providing perceptual preprocessing in a video encoder that takes advantage of the insensitivity of the human visual system (HVS) to mild changes in pixel intensity in order to segment video into regions according to perceptibility of picture changes. Then, the regional bit rate and complexity is reduced by repeating regions which have changed an imperceptible amount from the preceding frame. In addition, the invention accurately models the motion in areas with perceptually significant differences to improve the coding quality. Depending on picture content, perceptual preprocessing achieves varied degrees of improvement in computational complexity and compression ratio without loss of perceived picture quality.

In an illustrative embodiment of the invention, a method of encoding a video sequence including a sequence of video images is provided. The inventive method includes first comparing elements of a portion of a first video image (e.g., pixels of a macroblock of a current frame) with elements of a portion of a second video image (e.g., corresponding pixels of a macroblock of a previous frame) to generate respective intensity difference values for the element comparisons. Then, a first value is assigned to the intensity difference values that are at least above a visually perceptible threshold value and a second value is assigned to the intensity difference values that are at least below the visually perceptible threshold value. Next, the method includes summing the first and second values to generate a sum. If the sum is at least greater than a predetermined value, the portion of the first video image is encoded (e.g., motion compensated). It is to be further appreciated that the invention is fully compatible and, thus, may be implemented with video standards such as, for example, H.261, H.263, Motion-JPEG, MPEG-1, and MPEG-2.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The following description will illustrate the invention using an exemplary video encoding system. It should be understood, however, that the invention is not limited to use with any particular type of video signal format, video encoding standard or encoding system configuration. The invention is instead more generally applicable to any video encoding system in which it is desirable to improve the efficiency of an encoding process for generating encoded bit streams with respect to computational complexity and compression ratio without adversely affecting perceived picture quality. The term "video sequence" should be understood to include any frame or field sequence which is in a form suitable for encoding in accordance with standards such as, for example, H.261, H.263, Motion-JPEG, MPEG-1 and MPEG-2. The terms "image" or "picture" as used herein refer to a frame or field of a video sequence. The term "block" as used herein is intended to include not only macroblocks as defined in the above-noted compression standards, but more generally any grouping of pixel elements in a video frame or field.

Prior to a detailed description of preferred embodiments of the invention, some background on perceptual coding will be given. The history of perceptual coding can be traced back to the Weber-Fechner law of experimental psychology. It was found that the human capacity to distinguish a change in magnitude of a stimulus depends on the current magnitude of that stimulus. For example, it is generally easier to distinguish a 2-pound weight from a 1-pound weight, than it is to distinguish a 21-pound weight from a 20-pound weight. In the 1800s, Weber developed a quantitative description of the relationship between stimulus intensity and discrimination now known as Weber's law, namely:

$$\Delta S = K \cdot S \qquad (3)$$

where $\Delta S$ is the perceived intensity difference relative to a background stimulus S and K is a constant. Fechner applied Weber's law to sensory experience in the 1860s and found that the intensity of a sensation is proportional to the logarithm of the strength of the stimulus:

$$I = K \log(S/T) \qquad (4)$$

where I is the subjective experienced intensity, T is the threshold, or minimally perceptible stimulus level, and S(>T) is the strength of the supra-threshold stimulus. This relationship is referred to as the Weber-Fechner (WF) law. Further discussion of the WF law may be found in E. G. Boring, "Sensation and Perception in the History of Experimental Psychology," New York: Appleton-Century 1942.

In video, let I denote the actual intensity at a target pixel that is to be encoded, and let I' denote the displayed intensity at a spatio-temporal immediate neighbor of the target pixel as reconstructed from the data already transmitted. Then, provided |I–I'| is less than the WF threshold T, WF law implies that most human observers will not be able to sense the difference between displaying I' instead of I at the target pixel. In view of this limitation of human visual perception, we should expect a reasonable perceptual metric for video coding to achieve zero distortion numerically even though some (I, I') pairs are not exactly the same. A perceptual metric d(z) based on the Weber-Fechner logarithmical relationship has been presented in Y. J. Chiu et al., "Perceptual Rate-Distortion Theory," Proceedings of the 1996 IEEE International Symposium on Information Theory and Its Applications, Victoria, Canada, Sep. 17–20, 1996. The perceptual metric is represented as:

$$d(z) = \begin{cases} 0, & \text{when } |z| \le T \\ K \log(|z|/T), & \text{when } |z| \ge T \end{cases} \qquad (5)$$

where z=u–v represents the distortion of the input source U approximated by output source V. Recent psychology experiments have shown that the determination of T is very complicated for video because video involves temporal masking and spatial masking at the same time. This is discussed in A. N. Netravali et al., "Digital Pictures: Representation, Compression, and Standards," $2^{nd}$ Edition, AT&T Bell Laboratories, 1995. The threshold T is sometimes referred to as the "just-noticeable-distortion" (JND) in literature on perception, e.g., Y. J. Chiu et al., "Perceptual Rate-Distortion Theory," Proceedings of the 1996 IEEE International Symposium on Information Theory and Its Applications, Victoria, Canada, Sep. 17–20, 1996; and N. S. Jayant et al., "Signal Compression Based on Models of Human Perception," Proceedings of IEEE, Volume 10, October 1993. The ideal JND provides each pixel being coded with a threshold level below which discrepancies are perceptually distortion-free. The minimum rate required for perceptual lossless compression is called "perceptual entropy." Also of interest is the analysis of noticeable, above-threshold distortions that inevitably result at low bit rates. A term called "maximally noticeable distortion" (MND) characterizes distortion profiles above the perception threshold. In such scenarios, information-theoretic considerations from rate-distortion theory are coupled with research on perceptual metrics in order to adjust thresholds locally in an optimal fashion. A framework of rate-distortion consideration on perceptual metric can be found in Y. J. Chiu et al., "Perceptual Rate-Distortion Theory," Proceedings of the 1996 IEEE International Symposium on Information Theory and Its Applications, Victoria, Canada, Sep. 17–20, 1996.

In accordance with Weber-Fechner theory, the previous displayed frame can be treated as the perceived stimulus background. This permits an update of those pixel sites whose intensity differences exceed the visibility threshold specified by the background pixels. As described above, JND provides each signal being coded with a threshold level below which reconstruction error is imperceptible in the sense that a human can not perceive any impairment in the video if the discrepancies are below the JND value. The information for updating such pixels can be considered to be perceptual redundancy. Perceptual redundancy may be removed in the pixel domain via a procedure referred to as "bush-hogging," as described below and in U.S. Pat. No. 5,740,278, issued to T. Berger and Y. J. Chiu et al. on Apr. 14, 1998, entitled: "Facsimile-Based Video Compression Method And System," the disclosure of which is incorporated by reference herein.

Although the same threshold value can be used for each pixel, perceptual considerations suggest that only those prediction residuals that exceed a perceptually predetermined threshold need to be corrected. The selection of this perceptual threshold should be based not only on the difference intensity values in the difference frame domain but also on the intensity values of the background pixels.

The correct choice of the bush-hog threshold T for a particular pixel depends on many factors. If only achromatic images are considered, the principal factors are: (i) average spatial and temporal background luminance level against which the pixel is presented; (ii) supra-threshold luminance changes adjacent in space and time to the test pixel; and (iii) spatio-temporal edge effects. These factors are further discussed in A. N. Netravali et al., "Digital Pictures: Representation, Compression, and Standards," $2^{nd}$ Edition, AT&T Bell Laboratories, 1995. In real video, the three factors are correlated with one another. A complete study on the determination of pixel-by-pixel threshold T based on the intensity values of the background pixels and local masking effects is described in detail in the above-referenced U.S. Pat. No. 5,740,278 to Berger et al.

Figure 2:
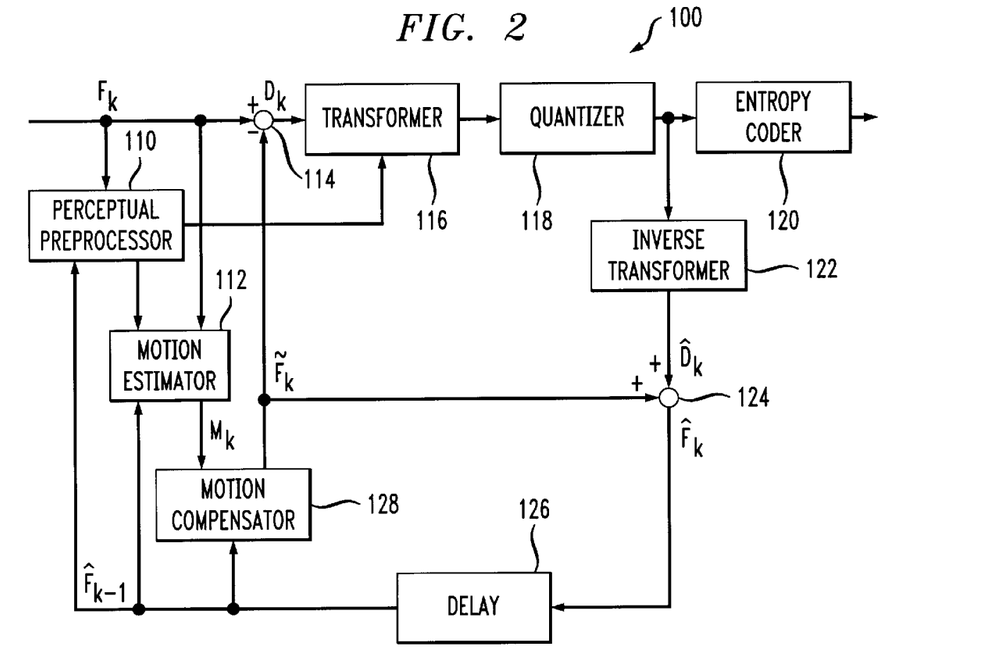
FIG. 2 is a block diagram of a video encoder according to an embodiment of the present invention.

Referring now to FIG. 2, an exemplary video encoder 100 in accordance with an illustrative embodiment of the invention is shown. As is evident, the exemplary configuration of the video encoder 100 includes similar components as the video encoder 10 (FIG. 1), with the important exception of the novel inclusion of a perceptual preprocessor 110 in the encoder 100 of the invention. As such, a description of the functions of the similar components of FIG. 2 (with their reference designations incremented by 100 as compared to FIG. 1) will not be repeated as they were explained in detail above and are known in the art. As shown, the video encoder 100 includes the perceptual preprocessor 110 coupled to the input of the encoder. The encoder 100 also includes a motion estimator 112 and a signal subtractor 114, both coupled to the input of the encoder. The motion estimator 112 is also coupled to the perceptual preprocessor 110. The encoder 100 also includes a transformer (e.g., DCT generator) 116 coupled to the perceptual preprocessor 110 and the signal subtractor 114, a quantizer 118 coupled to the transformer 116, and an entropy encoder 120 coupled to the quantizer 118 and the output of the encoder 100. An inverse transformer (e.g., an inverse DCT generator) 122 is also included and coupled between the quantizer 118 and the entropy encoder 120. The encoder 100 also includes a signal combiner 124 coupled to the inverse transformer 122, a delay 126 coupled to the signal combiner 124 and the perceptual preprocessor 110, and a motion compensator 128 coupled to the delay 126, the signal subtractor 114, the signal combiner 124, and the motion estimator 112.

From implication of the Weber-Fechner theory, we note that the values of residuals that do not exceed the perceptual threshold T may not need to be corrected. If the residuals of the pixels inside a macroblock are small enough, then we can continue to use the previously displayed macroblock without updating and at no loss of perceived quality. Accordingly, the computational effort of motion estimation/ compensation for such macroblock is saved or can be preserved for other macroblocks requiring more motion searches.

It is to be appreciated that the perceptual preprocessor 110 of the invention provides such advantages by making use of the insensitivity of the human visual system (HVS) to the mild changes in pixel intensity in order to segment video into regions according to perceptibility of picture changes. With the information of segmentation, we then determine which macroblocks require motion estimation. Thus, as shown in FIG. 2, the current picture (i.e., frame $F_k$) and the previously reconstructed picture (i.e., frame $\hat{F}_{k-1}$) are input to the perceptual preprocessor 110. The following description is an explanation of an embodiment of a perceptual preprocessing method according to the invention to be performed by the perceptual preprocessor 110 based on such input signals.

Figure 3:
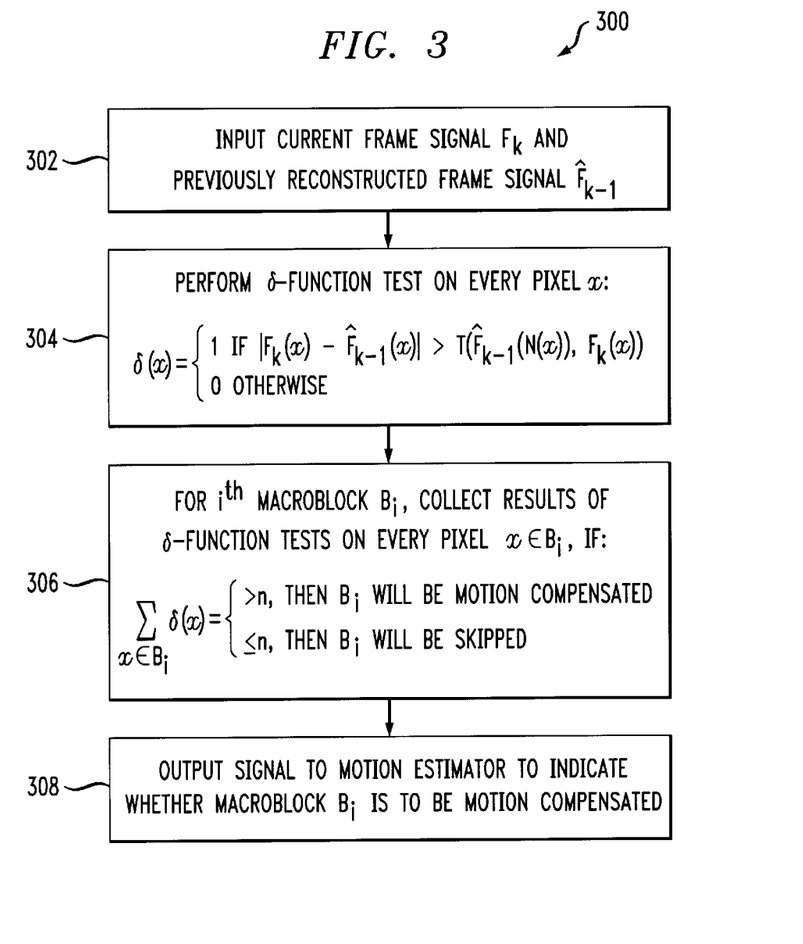
FIG. 3 is a flow chart of a perceptual preprocessing method according to an embodiment of the present invention.

Referring to FIG. 3, a flow chart of a perceptual preprocessing method 300 according to the invention is shown. In step 302, the current frame $F_k$ and the previously reconstructed frame $\hat{F}_{k-1}$ are input. Then, in step 304, a δ-function test, also known as the "bush-hogging" thresholding process, is performed on every pixel x such that:

$$\delta(x) = \begin{cases} 1 & \text{if } |F_k(x) - \hat{F}_{k-1}(x)| > T(\hat{F}_{k-1}(N(x)), F_k(x)) \\ 0 & \text{otherwise} \end{cases} \quad (6)$$

where N(x) is the neighborhood of x. The term "$F_k(x) - \hat{F}_{k-1}(x)$" is known in the art as a difference frame. It is to be appreciated that the size of the neighborhood N(x) for x involves temporal masking and perhaps spatial masking. This is due to the consideration that sometimes two successive pixels on the same line in the previously reconstructed frame $\hat{F}_{k-1}$, say (i, j−1) and (i,j), where each pixel x in the frame is characterized by a (row, column) coordinate, both have intensity difference magnitudes, with respect to their counterparts in the current frame $F_k$, that may be above a certain perceptual threshold. In such case, rather than consider an independent pixel in setting threshold T, the intensities of neighboring pixels may be considered since it is known that human visual perception may be more sensitive to intensity change in a given neighborhood rather than in any single pixel. As such, it is to be appreciated that the model to determine the threshold function $T(\hat{F}_{k-1}(N(x)), F_k(x))$ is non-trivial. Accordingly, a preferred approach which is practical and effective is to use the pixel at the same location in the previously reconstructed frame to represent N(x) and use only this pixel as a reference to model the threshold as $T(\hat{F}_{k-1}(N(x)))$. Thus, each pixel x is tested and, if the intensity difference between pixel x in the current frame and the previously reconstructed frame is greater than the threshold function, then δ(x) equals 1 for that pixel, otherwise, δ(x) equals 0. By way of further example, threshold T may be set to a single intensity value that accommodates human visual perception levels based on psycho physical experimentation. It is to be understood that, given the teachings of the invention, one of skill in the art will contemplate other methods of modeling the threshold function.

In any case, the δ-function tests result in an intensity difference value being obtained for each comparison of a pixel in $F_k(x)$ with a corresponding pixel in $\hat{F}_{k-1}(x)$. If the intensity difference value is greater than the perceptual threshold T, then a value of one (1) is assigned to the comparison, else a value of zero (0) is assigned. It is to be appreciated that the δ-function tests may be performed on an entire frame or on one or more macroblocks at a time.

Next, in step 306, for the ith macroblock $B_i$ of the current frame, the results of the δ-function test on every pixel $x \in B_i$ are collected such that if:

$$\sum_{x \in B_i} \delta(x) = \begin{cases} > n, & \text{then } B_i \text{ will be motion compensated} \\ \leq n, & \text{then } B_i \text{ will be skipped.} \end{cases} \quad (7)$$

Thus, the δ(x) results are summed for a given macroblock and, if the sum is greater than a decision value n, then the macroblock is motion compensated by the remainder of the encoder, for example, as explained above. However, if the sum is less than or equal to the decision value n, then the macroblock is skipped, that is, not motion compensated. Advantageously, if a current frame macroblock under evaluation contains pixels that, after comparison to similarly situated pixels in a previously reconstructed frame macroblock, do not result in a sum greater than the decision value, then that macroblock is not subjected to motion estimation/compensation. This results in a segmentation of a frame into macroblocks that have changed a visually perceptible amount from the previous frame and macroblocks that have not changed a visually perceptible amount from the previous frame. As a result, the computational effort otherwise associated with motion estimation/compensation of that macroblock is saved or may be allocated to motion estimation/compensation of another macroblock or some other encoder processing function. It is to be appreciated that the decision value n for the number of pixels surviving from bush-hogging or thresholding ($\delta$-function tests) may be set to a default value of zero in order to provide a perceptually distortion-free macroblock. However, we have observed that a video signal generated with a small, non-zero value n can be indistinguishable from a video signal generated with n equal to zero. It is to be appreciated that using a decision value greater than zero permits the encoder 100 to skip more macroblocks so that there is a greater realization of savings with respect to computational effort without sacrificing picture quality. Lastly, in step 308, an output signal is sent to the motion estimator 112 to inform the motion estimator whether or not each macroblock should be motion compensated. The output signal is also provided to the transformer 116, which then informs the other affected components of the encoder 100 (i.e., quantizer 118, entropy encoder 120, etc.), that a particular macroblock is not to be processed thereby. That is, once a macroblock is identified as one to be skipped, the macroblock is not motion estimated/compensated and therefore the transformer 116, the quantizer 118, and the entropy encoder 120 do not process data associated with that particular macroblock.

It should be understood that an encoder implementing these inventive compression techniques then need only transmit or store motion vectors for those macroblocks that are motion compensated, that is, those macroblocks that have been identified as having changed a visually perceptible degree from a corresponding macroblock of the previous frame. Advantageously, a corresponding video decoder need only inverse motion compensate these motion compensated macroblocks and repeat the corresponding macroblocks from the previous frame for the macroblocks of the current frame that were not motion compensated. Thus, improved computational efficiency is realized in a video decoder according to the coding techniques of the invention.

EXPERIMENTAL RESULTS

It is to be appreciated that the teachings of the present invention may be implemented in a wide variety of video applications and, as such, the examples discussed herein are not intended to limit the invention. By way of example, the encoding techniques of the invention may be employed to provide a low complexity motion compensation solution in order to realize a software-only low bit rate video conferencing system. Therefore, experiments were conducted on an H.263 system with a quantization step size of 12. Four QCIF (176*144 pixels) sequences were used to compare the compression efficiency and complexity of standard motion estimation techniques a feature-based method. The sequences were coded at 7.5 fps and we chose head-and-shoulder sequences commonly used in the ITU and ISO standard bodies. The sequences are "claire," "foreman," "grandmom," and "mom-daughter."

Exhaustive Search

Figure 4A:
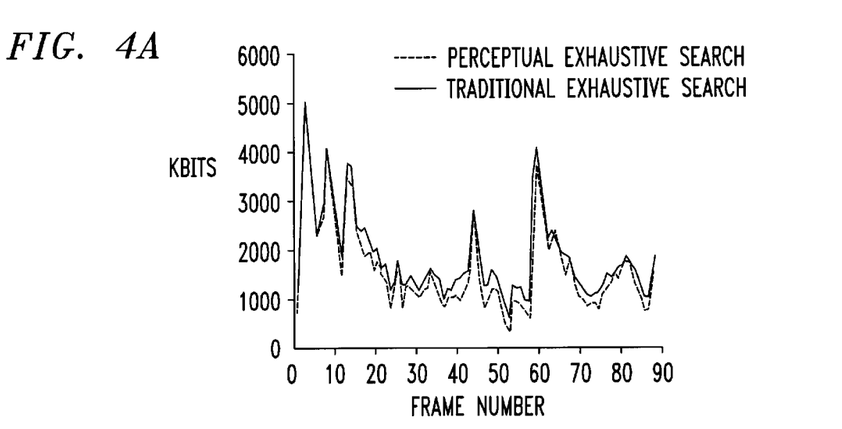
FIGS. 4A through 4C are graphical representations of simulation results associated with perceptual preprocessing according to the invention.
Figure 4B:
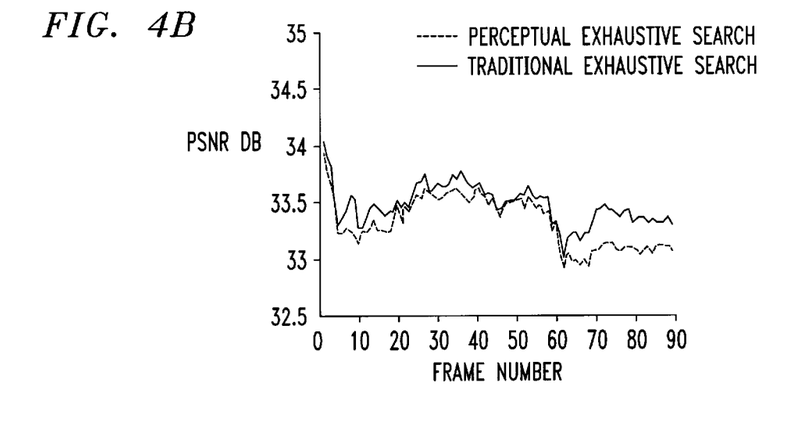
Figure 4C:
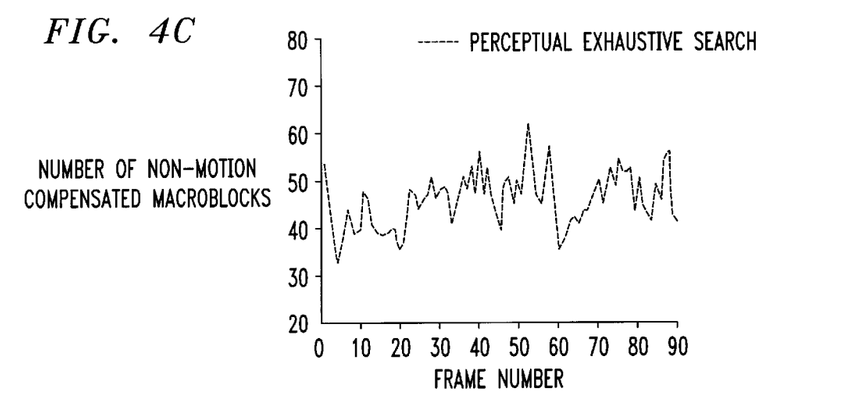

An optimal, full-search algorithm is used as a benchmark to evaluate the prediction error of the algorithm of the invention. FIG. 4A shows the "mom-daughter" data rate comparison between exhaustive motion search with and without the use of a perceptual preprocessor of the invention. Data rate means the bit rate generated using the H.263 algorithm with the two different motion estimation schemes. The peak signal to noise ratio (PSNR) is shown in FIG. 4B in order to compare the objective quality of the "mom-daughter" coded sequences. We have also found that informal subjective tests indicate that the two schemes provide very similar quality. FIG. 4C shows the number of macroblocks which have been selected to have zero motion vectors by the perceptual preprocessor of the invention. This number is used to indicate the savings in computational effort. On average, it has been shown that the perceptual preprocessor of the invention provides lower data rate (about 13.6% reduction), lower computational complexity (about 45.3%) with substantially similar picture quality for the "mom-daughter" video sequence.

Figure 5:
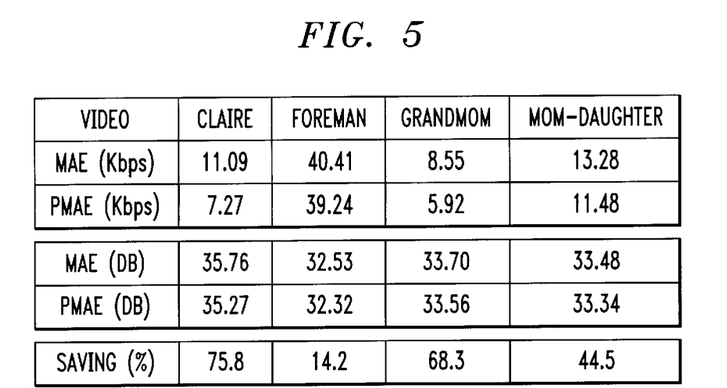
FIG. 5 is a tabular representation of simulation results associated with perceptual preprocessing according to the invention.

Referring to FIG. 5, a list of the average bit rates, PSNRs and the percentage of non-motion compensated macroblocks to total macroblocks for all four video sequences. PMAE represents the results with an embodiment of the perceptual preprocessor of the invention. These results show various degrees of improvement in data rate and improvement in computational complexity according to the picture content. It is evident that the degree of reduction in data rate is proportional to the percentage of non-motion compensated macroblocks. This is related to the selection of the minimum-MAE motion vector instead of choosing the zero-displaced motion vector for the smooth, low-motion backgrounds above.

Fast Searches

Figure 6A:
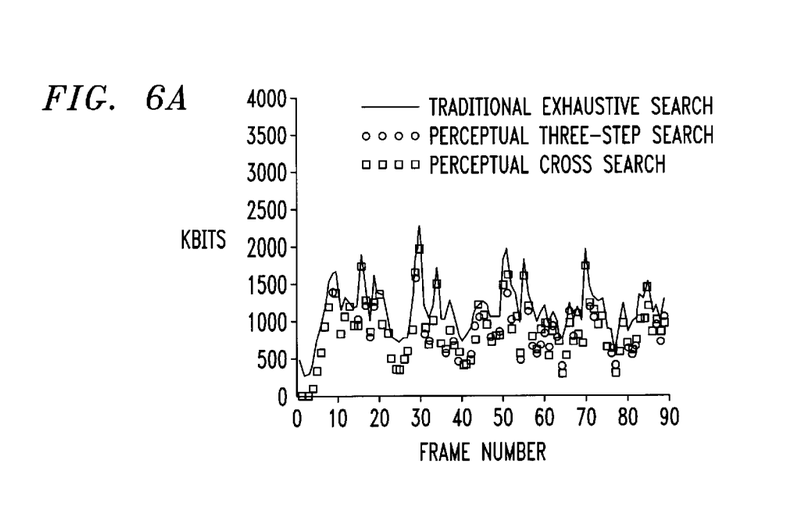
FIGS. 6A through 6C are graphical representations of simulation results associated with perceptual preprocessing according to the invention.
Figure 6B:
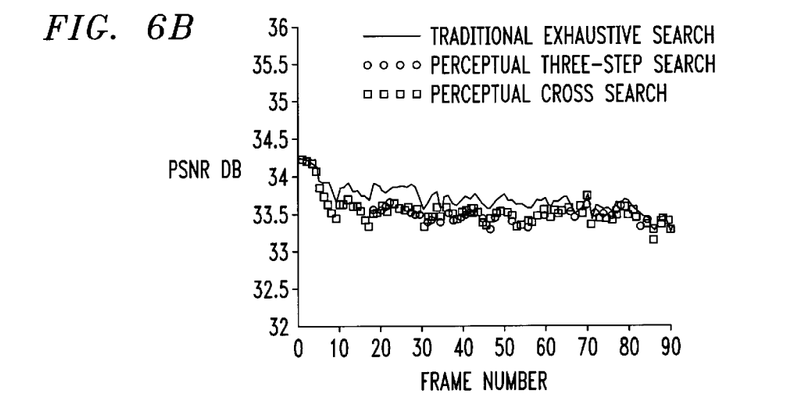
Figure 6C:
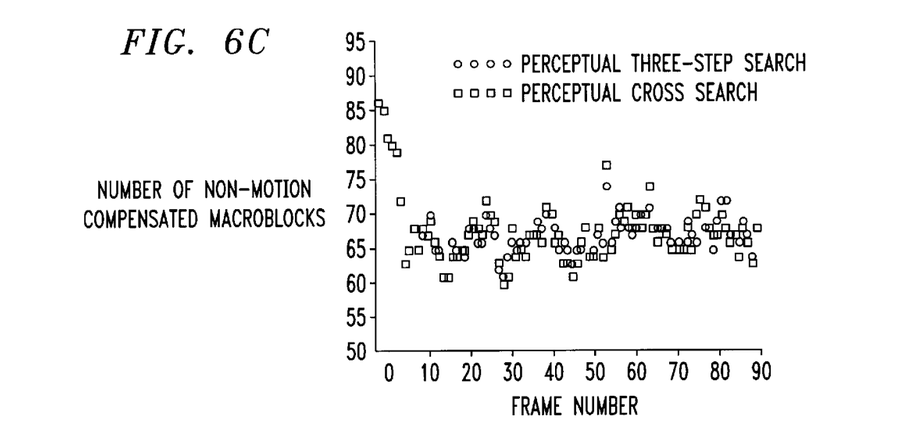
Figure 7A:
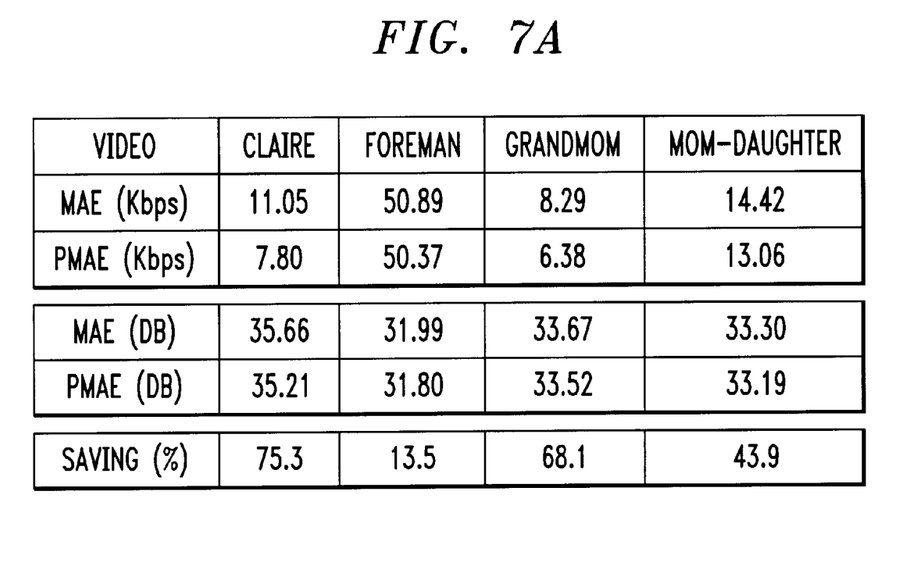
FIGS. 7A and 7B are tabular representations of simulation results associated with perceptual preprocessing according to the invention.
Figure 7B:
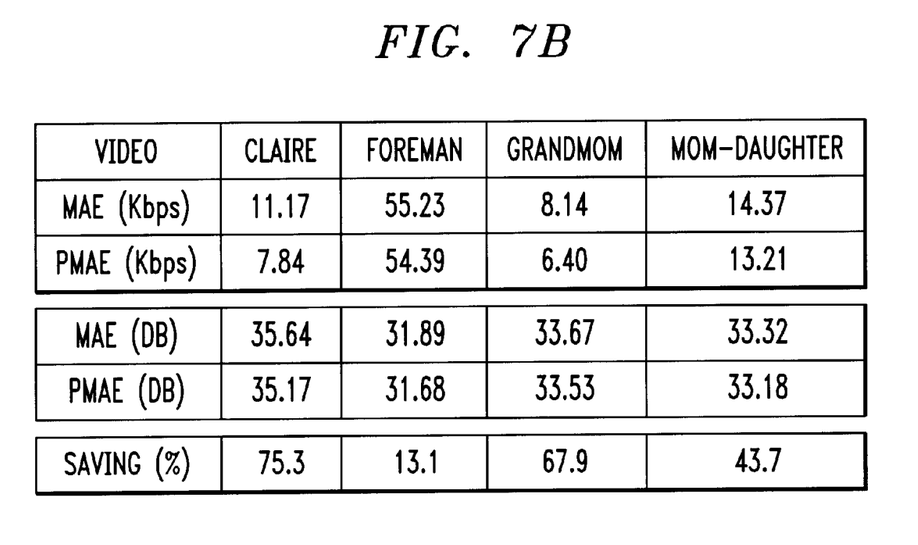

To justify the feasibility of the teachings of the invention to real-time software-only applications, the perceptual preprocessor of the invention was tested with fast motion search techniques such as cross search and three-step search schemes. Such fast search techniques are known in the art, for instance, as described in A. N. Netravali et al., "Digital Pictures: Representation, Compression, and Standards," $2^{nd}$ Edition, AT&T Bell Laboratories, 1995. FIGS. 6A through 6C show the "grandmom" sequence results for the three-step search with and without perceptual preprocessing. Note that the results of the cross search scheme are similar. Again, it is found that perceptual preprocessing according to the invention achieves lower data rate (about 21.4% lower) and lower computational complexity (about 68.2% lower) at the same time providing a picture quality which is indistinguishable with pictures processed without perceptual preprocessing techniques. FIGS. 7A and 7B illustrate average bit rates, PSNRs, and the percentage of non-motion compensated macroblocks for all video sequences based on the cross search scheme and the three-step search, respectively.

Based on the simulation results presented above, it is evident that the spatio-temporal perceptual preprocessor attains an improved compression ratio without a perceived loss in picture quality, and at the same time reducing computational complexity. These are results that are advantageous to any application that has limited computing capability and restricted transmission bandwidth. Further, perceptual preprocessing techniques of the invention indicate which macroblocks have undergone large changes from the previous frame. These blocks, which usually involve high motion or scene changes, require more motion searches. We performed simulations for a fixed computing budget and use the savings of computational effort in non-motion compensated blocks to compute the motion vectors in blocks which have high motion. Higher compression ratio and sharper picture quality can be attained, especially in the high motion periods.

It should be noted that the elements of the encoder 100 may be implemented using a central processing unit, microprocessor, application-specific integrated circuit or other data processing device in a computer, video transmitter, cable system headend, television set-top box or other type of video signal processor. The central processing unit, microprocessor, application-specific integrated circuit or other data processing device may also have memory associated therewith for storing data and results associated with each elements function when necessary. The invention may be utilized in conjunction with numerous types of video processing or transmission systems, including but not limited to global computer networks such as the Internet, wide area networks, local area networks, cable systems, satellite systems and standard wired telephone networks.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of encoding a video sequence including a sequence of video images, the method comprising the steps of:

comparing elements of a portion of a first video image with elements of a portion of a second video image such that each element from the portion of the first video image that results in a difference value that is at least greater than a perceptual threshold is identified and the number of such elements is added to generate a sum; and comparing the sum to a decision value such that the portion of the first video image is encoded when the sum is at least greater than the decision value;

wherein the threshold value is modeled as a function of the first and second video images.

2. The method of claim 1, wherein the first video image is a current frame of the video sequence.

3. The method of claim 1, wherein the second video image is a previous frame of the video sequence.

4. The method of claim 1, wherein the respective portions of the first and second video images compared are macroblocks.

5. The method of claim 1, wherein the decision value is zero.

6. The method of claim 1, wherein the decision value is non-zero.

7. The method of claim 1, wherein the difference value is an intensity difference value.

8. The method of claim 1, wherein encoding the portion of the first video image when the sum is at least greater than the decision value includes motion compensation.

9. A method of encoding a video sequence including a sequence of video images, the method comprising the steps of:

comparing elements of a portion of a first video image with elements of a portion of a second video image to generate respective difference values for the element comparisons;

assigning a first value to the difference values that are at least above a perceptual threshold value and a second value to the difference values that are at least below the perceptual threshold value, wherein the threshold value is modeled as a function of the first and second video images;

summing the first and second values to generate a sum; and encoding the portion of the first video image when the sum is at least greater than a predetermined value.

10. Apparatus for encoding a video sequence including a sequence of video images, comprising:

a processor for comparing elements of a portion of a first video image with elements of a portion of a second video image such that each element from the portion of the first video image that results in a difference value that is at least greater than a perceptual threshold is identified and the number of such elements is added to generate a sum, the processor also for comparing the sum to a decision value such that a signal is generated by the processor representing the result of the second comparison; and an encoder coupled to the processor for encoding the portion of the first video image when the signal received from the processor indicates that the sum is at least greater than the decision value;

wherein the threshold value is modeled as a function of the first and second video images.

11. The apparatus of claim 10, wherein the first video image is a current frame of the video sequence.

12. The apparatus of claim 10, wherein the second video image is a previous frame of the video sequence.

13. The apparatus of claim 10, wherein the respective portions of the first and second video images compared are macroblocks.

14. The apparatus of claim 10, wherein the decision value is zero.

15. The apparatus of claim 10, wherein the decision value is non-zero.

16. The apparatus of claim 10, wherein the difference value is an intensity difference value.

17. The apparatus of claim 10, wherein the encoding performed by the encoder includes motion compensation.

18. Apparatus for encoding a video sequence including a sequence of video images, comprising:

a processor for comparing elements of a portion of a first video image with elements of a portion of a second video image to generate respective difference values for the element comparisons, assigning a first value to the difference values that are at least above a perceptual threshold value and a second value to the difference values that are at least below the perceptual threshold value, wherein the threshold value is modeled as a function of the first and second video images, and summing the first and second values to generate a sum; and an encoder for encoding the portion of the first video image when the sum is at least greater than a predetermined value.

* * * * *